United States Patent [19]

Maffei

[11] 4,410,158

[45] Oct. 18, 1983

[54] OVER-BED TELEVISION SUPPORT FRAME

[76] Inventor: Eugene R. Maffei, 3908 Edinburgh Dr., Youngstown, Ohio 44511

[21] Appl. No.: 172,864

[22] Filed: Jul. 28, 1980

[51] Int. Cl.³ ............................................. E04G 3/00
[52] U.S. Cl. ...................................... 248/214; 5/507; 5/508; 248/279
[58] Field of Search .................... 248/278, 279, 280.1, 248/445, 214, 215; 5/508, 503, 507

[56] References Cited

U.S. PATENT DOCUMENTS

| | | | |
|---|---|---|---|
| 1,083,764 | 1/1914 | Smith | 248/445 |
| 2,337,675 | 12/1943 | McNeil | 248/445 |
| 3,223,370 | 12/1965 | Pignon | 248/214 |
| 3,358,957 | 12/1967 | Lindenmuth | 248/279 |
| 3,662,981 | 5/1972 | Hogrebe | 248/278 |
| 3,889,914 | 6/1975 | Torme | 248/445 |

FOREIGN PATENT DOCUMENTS 789207  7/1968  Canada .................................... 5/508

*Primary Examiner*—J. Franklin Foss
*Attorney, Agent, or Firm*—Harpman & Harpman

[57] ABSTRACT

A support frame for a television receiver has a vertical portion and clamping devices for positioning the same on the headboard of a bed and a horizontal portion with an adjustable carrier for the television receiver. The frame is rotatable with respect to the clamping devices so that the television receiver can be moved in an arc relative to the vertical portion of the support frame and the carrier is adjustable for movement along the horizontal portion of the support frame and the television carrier is tiltable sideways so that the downwardly facing picture tube of the television set can be positioned in a preferred location with respect to a patient lying on the bed in face up position.

3 Claims, 4 Drawing Figures

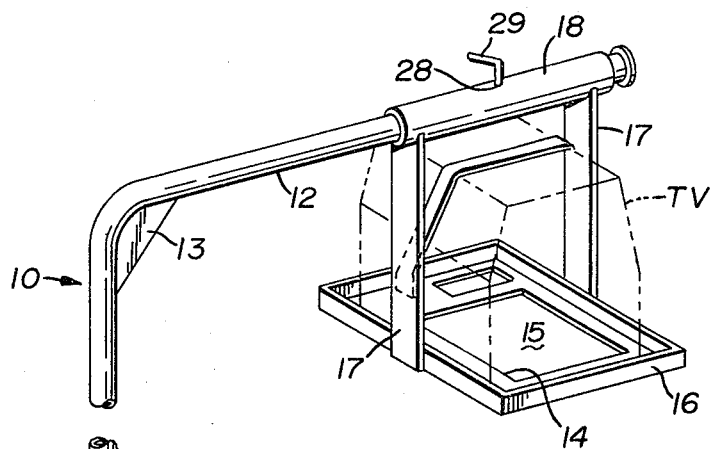
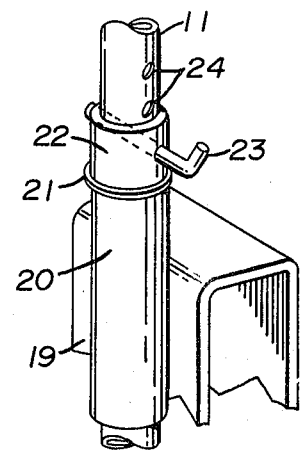
FIG. 1
FIG. 2
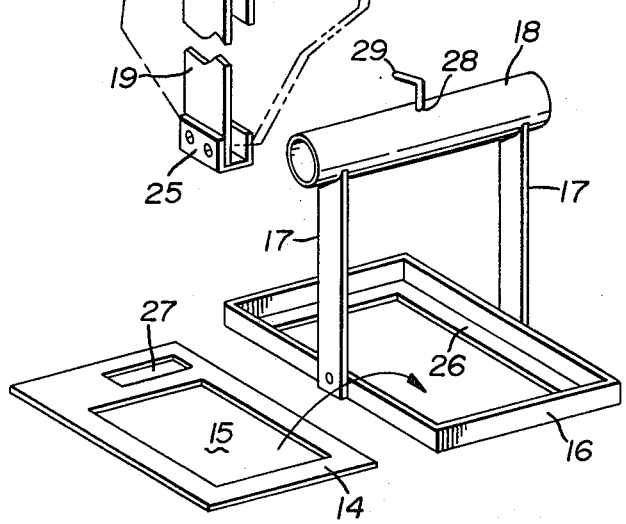
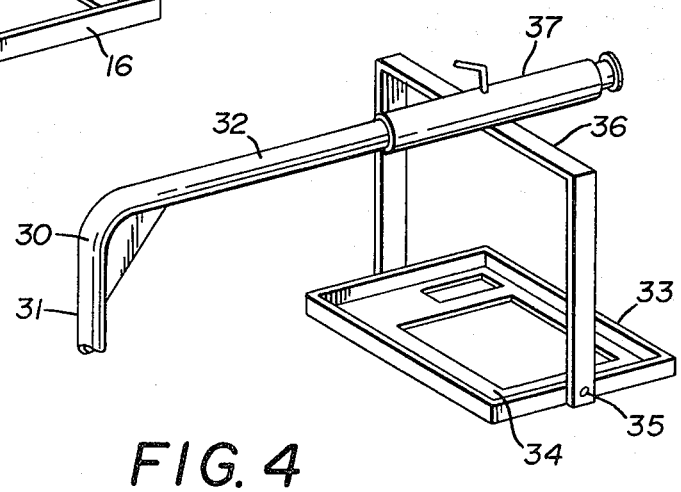
FIG. 3
FIG. 4

OVER-BED TELEVISION SUPPORT FRAME

BACKGROUND OF THE INVENTION (1) Field of the Invention

This invention relates to devices for supporting a television receiver in position above a bed.

(2) Description of the Prior Art

A bedstead television support is shown in U.S. Pat. No. 3,358,957, a support being attachable to the footboard of a bed and arranged to position a television receiver with the picture tube in vertical position and facing a person on the bed.

The present invention adjustably mounts a support frame on the headboard of a bed with the vertical portion of the support frame being rotatable and the horizontal portion of the support frame adjustably positioning a television receiver in face down relation by means of a carrier suspended from the horizontal portion of the support frame. The television receiver and its horiznotally disposed downwardly facing picture tube can therefore be adjustably positioned in a number of locations with respect to a patient lying in face up position on the bed.

SUMMARY OF THE INVENTION

An over-bed television support frame utilizes an inverted L-shaped support member the vertical portion of which is adjustably secured to a clamping device on the headboard of a bed and a carrier frame having an opening for registry with the face of the picture tube of the television receiver is adjustably positioned beneath the horizontal portion of the L-shaped frame and suspended therefrom. Additional openings in the carrier plate permit the television receiver controls to be operated.

DESCRIPTION OF THE DRAWINGS

FIG. 1 is a perspective view with parts broken away and wherein broken lines indicate the television receiver and the headboard of a bed.

FIG. 2 is a perspective view on an enlarged scale of a portion of the device seen in FIG. 1;

FIG. 3 is a two-part perspective elevation of the television receiver carrier seen in FIG. 1 of the drawings; and FIG. 4 is a perspective elevation of a modified over-bed television support frame.

DESCRIPTION OF THE PREFERRED EMBODIMENT

By referring to FIG. 1 of the drawings, it will be seen that the over-bed television support frame conprises an inverted L-shaped member generally indicated at 10 and preferably formed of cross sectionally circular tubular material. The member 10 has a vertical portion 11 and a horizontal portion 12 and these portions are of substantially equal length. A gusset 13 is positioned across the corner defined by the right angular disposition of the horizontal portion 12 with respect to the vertical portion 11.

Broken lines in FIG. 1 and carrying the legend TV indicate a television receiver positioned face down on a carrier plate 14 having a window 15 therein and of a size comparable with that of the size of the picture tube of the television receiver. The carrier plate 14 is positioned in a horizontally disposed rectangular frame 16 which in turn is carried by a pair of spaced vertical arms 17, the upper ends of which are secured to a tubular member 18 which is slidably disposed on the horizontal portion 12 of the support frame 10.

Still referring to FIG. 1 of the drawings, it will be seen that additional broken lines carrying the legend HB indicate a portion of a headboard of a bed over which the television receiver is positioned. A clamping device 19, which may be an inverted U-shaped bracket, is positioned over the headboard and secured thereto. A tubular socket 20 is attached to the clamping device 19 with its axis disposed vertically and the lower part of the vertical portion 11 of the support member 10 is rotatably and axially adjustably positioned therein. The upper end of the tubular socket 20 is flanged as at 21 and a collar 22 rests thereon and as it may best be seen by referring to FIG. 2 of the drawings, the collar 22 is apertured so that a pin 23 can be positioned therethrough to engage vertically spaced apertures 24 in the vertical portion 11 of the support member 10.

It will thus be seen that the support member 10 and the television receiver on the carrier plate 14 can be swung in an arc based on the axis of the tubular socket 20 so that the television receiver can be moved to one side of the bed with respect to the patient or alternately adjusted in desired position above the patient's head.

Still referring to FIG. 1 of the drawings, it will be seen that the clamping device 19 has at least one portion that extends downwardly a sufficient distance so that a secondary clamping device 25 can be engaged on a lower portion of the headboard of the bed as may be necessary to properly support the support frame 10 and the television receiver with respect thereto.

In FIG. 3 of the drawings, the carrier plate 14 with its window 15 will be seen to be a separate piece which is normally positioned in the rectangular frame 16 and supported on an inturned horizontal flange 26 thereof. The carrier plate 14 is also provided with a second opening 27 which is positioned to register with the controls of the television receiver so that they can be operated therethrough. Alternately the rectangular frame 16 and carrier plate 14 may be formed as a unitary structure along with the arms 17 and the tubular member 18.

In FIGS. 1 and 3 of the drawings, the tubular member 18 is illustrated as having a threaded opening 28 therein in which a threaded clamping member 29 is engaged so that the tubular member 18 may be secured in desired adjusted relation on the horizontal portion 12 of the support member 10.

In FIG. 4 of the drawings, a modification of the invention is illustrated in which the means of supporting the television receiver are adjustable longitudinal of the horizontal portion of the support member as in the preferred form of the invention and also tiltable with respect thereto so that the picture tube of the television receiver may be positioned at a slight angle from horizontal. In FIG. 4 the support member is generally indicated by the numeral 30, a vertical portion thereof by the numeral 31 and the horizontal portion thereof by the numeral 32.

A horizontally positioned rectangular frame 33 having a carrier plate 34 is pivotally mounted on the lower ends of arms 35 which are in turn secured to the outer ends of a horizontally disposed frame member 36. The center of the frame member 36 is secured to a slidable tubular member 37 positioned on the horizontal portion 32 of the support member 30 and a television receiver positioned on the carrier plate 34 will thus have its generally horizontally disposed picture tube viewable through an opening in the carrier plate 34. The vertical portion 31 of the device illustrated in FIG. 4 of the drawings is provided with a clamping device for attachment to the headboard of a bed or the like the same as that hereinbefore described in connection with the preferred embodiment of the invention.

If desired an elastic strap may be attached to the arms of the rectangular frame of the device so as to hold a television receiver in desired position on the rectangular frame. Such a strap is shown in FIG. 1 of the drawings.

Although but two embodiments of the present invention have been illustrated and described, it will be apparent to those skilled in the art that various changes and modifications may be made therein without departing from the spirit of the invention and having thus described my invention what I claim is:

1. An over-bed television support frame for use on a bed having a headboard, the support frame comprising a clamping device of a size emabling it to be engaged of said headboard, a vertically positioned tubular socket on said clamping device, an inverted L-shaped member having horizontal and vertical portions, said vertical portion of said L-shaped member rotatably engaged in said tubular socket, a horizontally disposed rectangular frame conprising an inturned horizontally disposed flange and a vertically standing flange thereabout, said inturned horizontally disposed flange adapted to engage the face of a television with said vertically standing flange retaining said television theron and means on said horizontal portion of said inverted L-shaped member suspending said rectangular frame therebeneath so that said television can be viewed by a person on the bed looking up at said television.

2. The over-bed television support frame of claim 1 and wherein an apertured carrier plate is positioned on the inturned horizontally disposed flange of said rectangular frame and arranged to support said television, said apertures in said plate arranged so that the face of the television tube of the television can be seen and the controls of the television operated.

3. The over-bed television support frame of claim 1 and wherein the means suspending the rectangular frame beneath the horizontal portion of the inverted L-shaped member comprise an elongated tubular body slidable on said horizontal portion, horizontally spaced vertical arms depending from said tubular body, said rectangular frame attached to the lower ends of said arms.

* * * * *